Feb. 23, 1954 G. E. ROWE 2,669,805
GLASS CHARGE DELIVERY AND FORMING APPARATUS
Filed Feb. 16, 1950 4 Sheets-Sheet 1
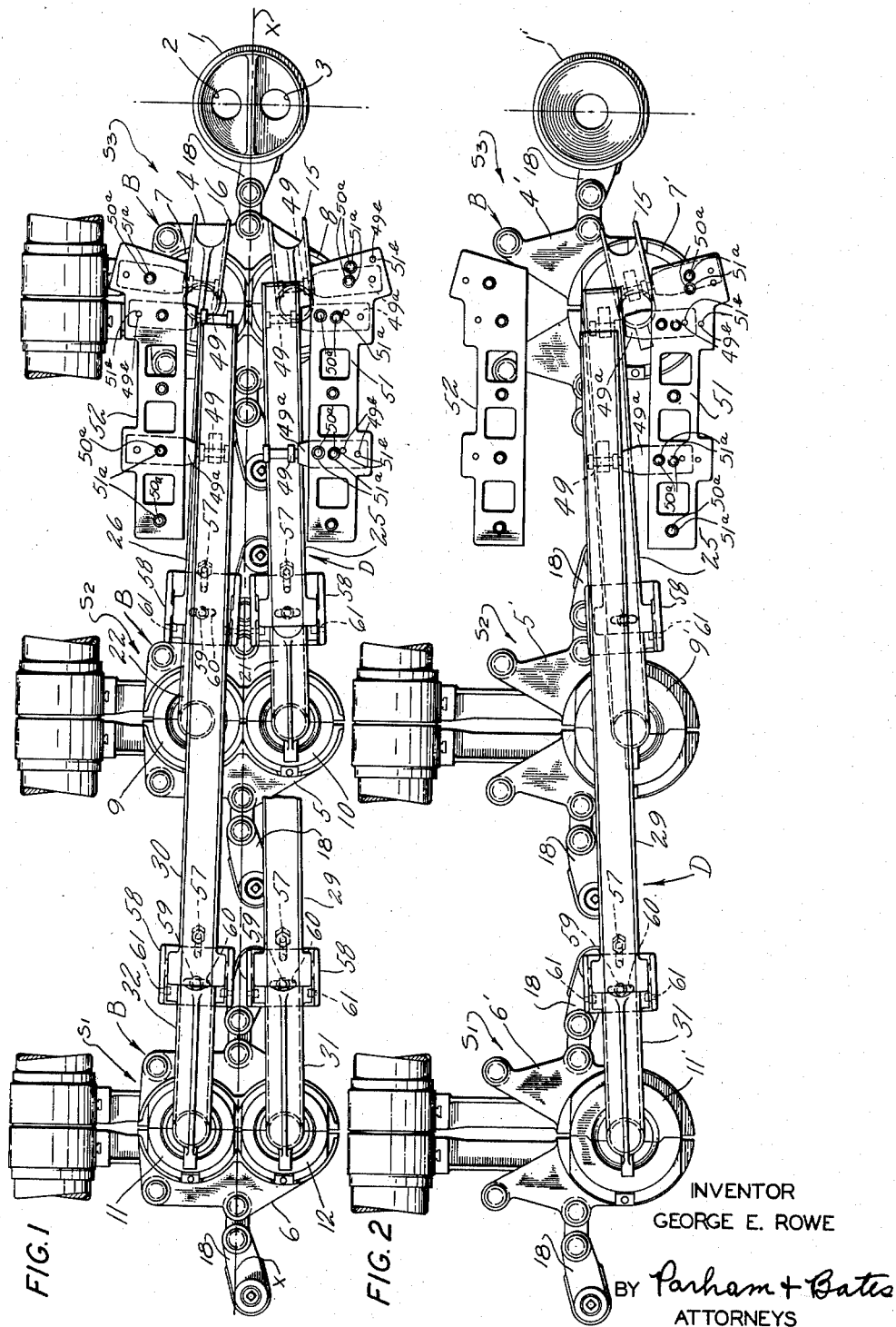
INVENTOR
GEORGE E. ROWE
BY Parham + Bates
ATTORNEYS

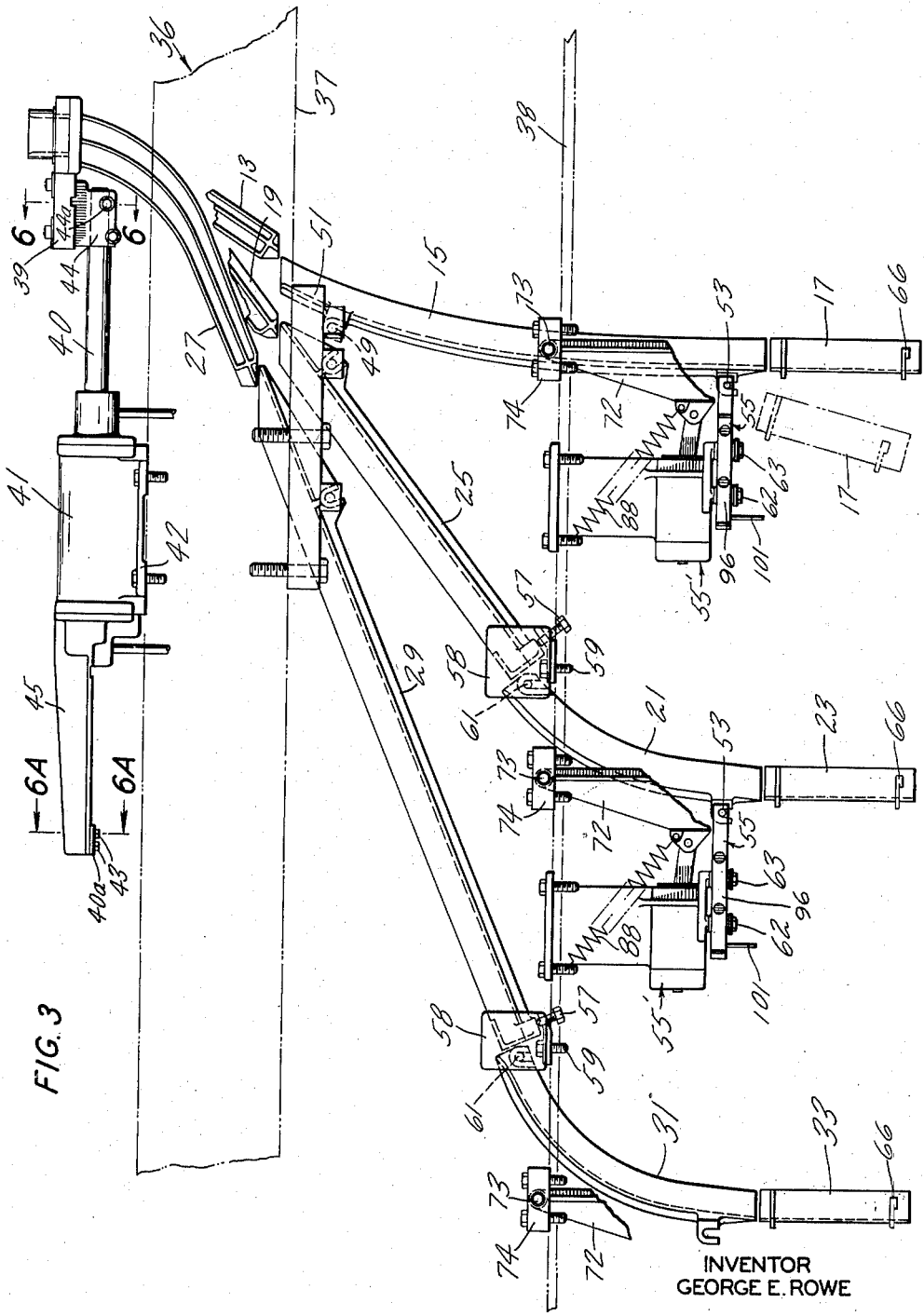

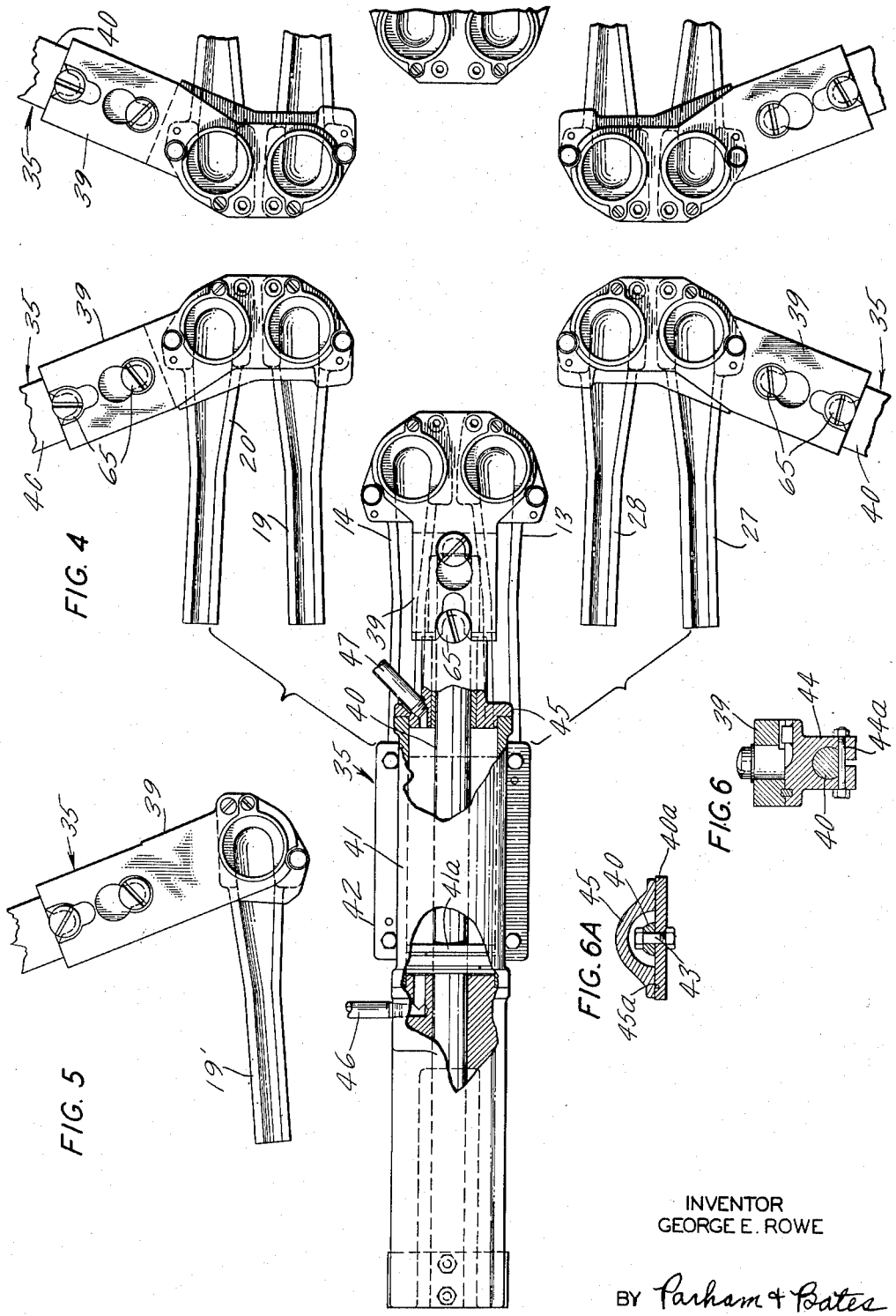

Feb. 23, 1954     G. E. ROWE     2,669,805
GLASS CHARGE DELIVERY AND FORMING APPARATUS
Filed Feb. 16, 1950     4 Sheets-Sheet 4
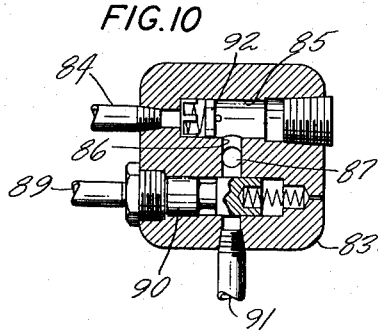
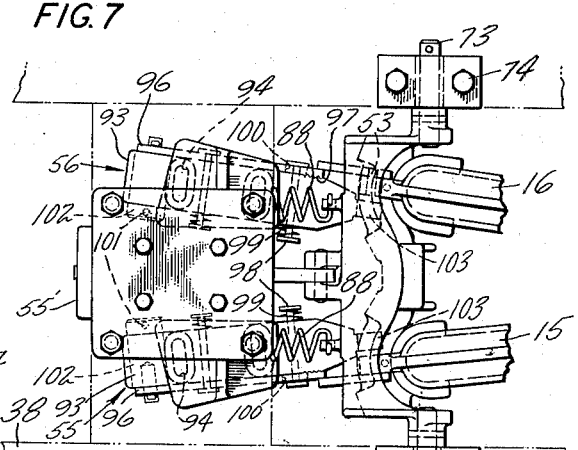
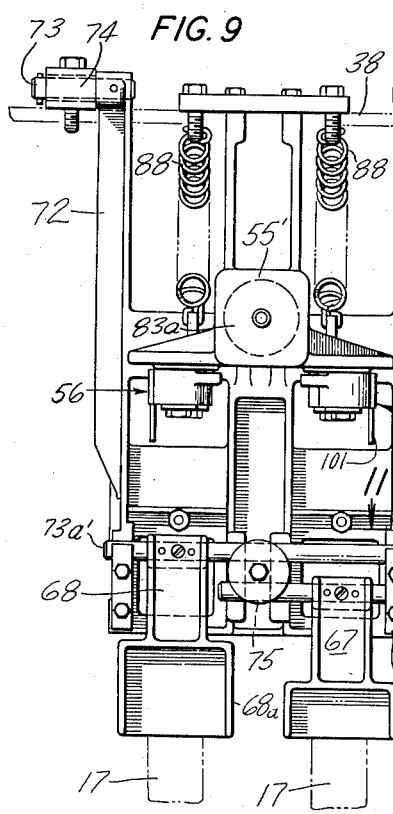
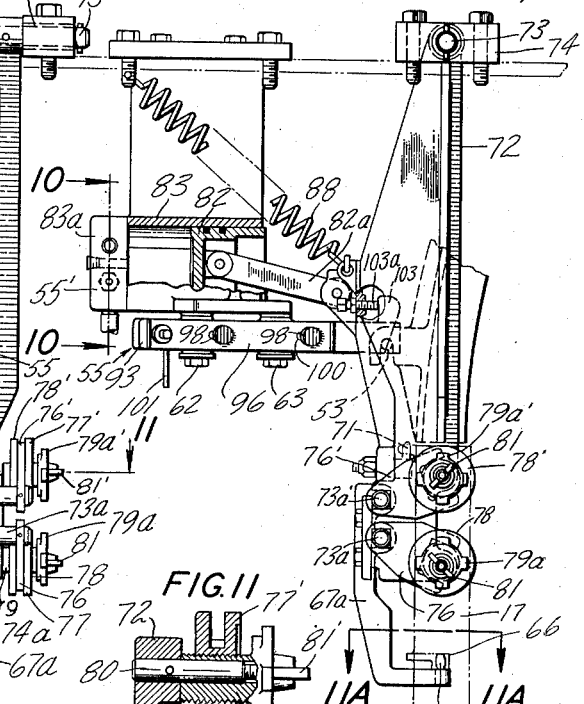
INVENTOR
GEORGE E. ROWE
BY Parham & Bates
ATTORNEYS Patented Feb. 23, 1954

2,669,805

UNITED STATES PATENT OFFICE 2,669,805

GLASS CHARGE DELIVERY AND FORMING APPARATUS

George E. Rowe, Wethersfield, Conn., assignor to Emhart Manufacturing Company, a corporation of Delaware Application February 16, 1950, Serial No. 144,420

12 Claims. (Cl. 49—5)

1

The present invention relates to the manufacture of glassware from shaped charges of hot glass which may be periodically discharged from a forehearth feeder and delivered to blank molds for preliminary forming operations prior to transfer to blow molds for the final forming operations.

A principal object of the present invention is to provide improvements in forming machines of the type which are constructed of a plurality of independent sections, which sections are operated in sequence and which successively receive from a feeder either single or multiple individual gobs or charges of molten glass and form the charges into glass articles. Machines embodying the present invention include improved charge delivery or distributing mechanism for selectively conducting the charges of glass from the feeder outlet or outlets to the various sections and suitable means for operating, adjusting, lubricating and selectively using the delivery mechanism and the multiple section forming machine for either single or multiple gob operation.

A principal object is to provide a feeder-forming machine combination which is adapted selectively for either single or simultaneous multiple charge operation and which, when multiple charges are being handled, provides identical paths of travel for the several charges simultaneously discharged from the feeder and delivered to their respective blank molds.

A further object is to provide delivery apparatus wherein a scoop for receiving a single charge from the feeder may be replaced by a plurality of scoops for simultaneously receiving multiple charges and wherein the same mechanisms present the scoops at the feeder for charges and withdraws the scoops from the feeder without requiring further replacement or adjustment when changing between single and multiple charge operation.

A further object is to provide delivery apparatus including troughs which deliver charges from the scoops to deflectors at the blank molds and which are selectively adjustable for single and multiple gob operation.

Still another object is to provide delivery funnel assemblies which are adjustable for either single or multiple gob operation and for alignment of the funnels with their respective charge deflectors and blank molds so as to deliver charges centrally to the molds.

Another object is to provide improved operating mechanism for moving the funnels into and out of alignment with their blank molds.

Other objects and advantages of the present invention will be apparent from a reading of the following description of a preferred embodiment, the appended claims, and the accompanying drawings of the preferred embodiment to which reference is made and in which:

Figure 1 is a plan view showing the blank molds and mold transferring and inverting mechanism of three sections of a six section glassware forming machine and a double gob feeder orifice ring and delivery apparatus for feeding and delivering glass charges to the pair of blank molds of each of the six sections;

Fig. 2 is a plan view showing the three sections of the forming machine modified and adjusted for single gob operation instead of the double gob operation of Fig. 1;

Fig. 3 is a front elevation of the delivery mechanism including the apparatus common to Figs. 1 and 2;

Fig. 4 is a partial plan view of the scoops for a double gob six section forming machine;

Fig. 5 is a plan view of a single gob scoop for use with the single gobbing machine shown in Fig. 2;

Figs. 6 and 6A are cross-sectional views taken on the lines 6—6 and 6A—6A, respectively, of Fig. 3 showing details of the scoop operating mechanism;

Fig. 7 is an enlarged plan view of one of the delivery funnel operating mechanisms shown in Fig. 3;

Fig. 8 is a side elevation partly in section of the mechanism shown in Fig. 7;

Fig. 9 is a front elevation of the mechanism shown in Figs. 7 and 8;

Fig. 10 is a cross-sectional view taken on the line 10—10 of Fig. 8 showing valves which control the movement of a delivery funnel between its operative and inoperative positions;

Fig. 11 is a fragmentary cross-sectional view taken on lines 11—11 of Fig. 8, showing details of funnel adjustment mechanism; and Fig. 11A is a cross-sectional view taken on line 11A—11A of Fig. 8.

Referring more particularly to Fig. 1, there is shown a double orifice ring 1 which may be the discharge spout for a suspended-charge glass feeder located at the forehearth of a glass tank or furnace. It will be understood that the construction and operation of tanks and feeders are well known in the art and that the orifice ring 1 with its two spaced outlet or discharge holes 2 and 3 constitute a sufficient disclosure of charge feeding means for an understanding of the present invention without a more detailed description of the tank, forehearth and feeder mechanism with which they may be associated.

Glass charges of predetermined size and shape are periodically supplied from the outlets 2 and 3 by delivery mechanism generally designated D to blank mold assemblies. The assemblies are generally designated B for each of the three sections S1, S2, and S3 illustrated in Figs. 1 and 2 of a six-section machine.

Fig. 1 shows the blank mold holders 4, 5 and 6 and their blank molds 7—8, 9—10 and 11—12 for the three individual sections of the six-section forming machine. The other half of the machine preferably duplicates the half which is illustrated, the half which is not shown being located on the opposite side of the orifice ring 1.

Although not necessary to an understanding of the present invention, additional details of a forming machine suitable for performing the present invention, including details of the blank and blow molds, together with details of the operating, timing, transfer, cooling, lubricating and take out means may be obtained from copending application, Serial No. 103,903, filed July 9, 1949.

It will be understood that the present invention may be practiced with a fewer or greater number of individual sections.

The invention also provides for single gobbing operation of the forming machine, in which case, as is shown in Fig. 2, blank mold holders 4', 5' and 6' replace the holders 4, 5 and 6, shown in Fig. 1, and each is provided with a single blank mold 7', 9' and 11' in place of the pairs of blank molds 7—8; 9—10; and 11—12. When operating single gob, the two-outlet orifice ring 1 is replaced by a single outlet ring 1', and each blank mold 7', 9' and 11' is centered coincident with the outer molds 7, 9 and 11, respectively, of the double gobbing molds. Regardless of whether the apparatus is set up for single or double gobbing, all of the molds secured in the holders 4, 5 and 6 are supported at the same elevation relative to the feeder outlets 2 and 3. Like linkages for operating each of the mold sections are designated generally by the reference number 18.

The delivery mechanism D for the pair of blank molds 7—8 which are nearest the orifice ring 1 includes a pair of delivery scoops 13—14 (Fig. 4) together with an associated pair of delivery deflectors 15—16 (Fig. 1) and funnels 17 (Figs. 3, 8 and 9). A similar set of scoops 19—20 (Fig. 4), deflectors 21, 22 (Fig. 1) and funnels 23, together with delivery troughs 25, 26 deliver charges to the blank molds 9—10; and scoops 27—28, troughs 29—30, deflectors 31—32 and funnels 33 deliver charges to the outer pair of molds 11—12.

As shown in Fig. 4, six pairs of delivery scoops for six double gobbing sections, including the scoops 13, 14; 19, 20; and 27, 28 are located generally in a circle, and each pair is mounted on its own operating mechanism, generally designated 35, for moving the attached scoops sequentially into alignment with the orifice outlets 2 and 3 (Fig. 1). When changing from double to single gob operation, each pair of scoops 13, 14; 19, 20; and 27, 28 is replaced by a single scoop, as for example scoop 19' (Fig. 5) which attaches to the operating mechanism 35 and is movable into and out of alignment with the single outlet of the orifice ring 1' (Fig. 2).

As shown in Fig. 2, when the forming machine is set up for single instead of double gobbing operation, the troughs, deflectors and funnels which are identified by odd reference numbers, with minor relocating adjustments hereinafter described in further detail, supply the molds 7', 9' and 11' at the outer of the two mold locations of each section and the inner troughs, deflectors and funnels identified by the even reference numbers are removed.

In accordance with the present invention, the mold centers of each pair of double gobbing blank molds 7—8, 9—10, and 11—12 are located an equal distance apart and the gobs travel identical paths from the orifice outlets 2 and 3 from which they periodically receive their charges.

More particularly, the blank molds and the orifice ring 1 are located so that a line passing through the center of the outlets 2 and 3 is parallel to the lines connecting the centers of each pair of blank molds 7—8, 9—10, and 11—12. All of the molds are at the same elevation relative to the feeder outlets 2 and 3, and the molds of each pair of molds 7—8, 9—10, and 11—12 are equally spaced from opposite sides of a common vertical plane x—x and, as shown in Fig. 1, said feeder outlets 2 and 3 are equally spaced from opposite sides of the same vertical plane x—x. As indicated in Figs. 3 and 4, the profiles and plan of the scoops, deflectors and funnels for each pair of charges are identical.

The delivery mechanism D thus far described is supported by a frame structure which is generally designated 36 and which includes an upper supporting member 37 and a lower supporting member 38 (Fig. 3).

A glass feeding device which includes the interchangeable orifice rings 1 and 1' discharges molten glass in successive mold charges of predetermined size and shape. The charges are cut off by suitable shears (not shown) and delivered successively to the scoops which are horizontally reciprocable between their inoperative positions shown in Fig. 4 and a common operative position (shown in phantom) to which they are successively moved and at which their intake orifices are aligned with the orifice ring outlets to intercept the mold charges issuing from the feeder. The descending charges are directed from the scoops by the delivery troughs and deflectors into the delivery funnels from which they are discharged into the underlying blank molds.

The reciprocably movable pairs of scoops are carried by brackets 39 (Figs. 3 and 4), each of which is mounted on the outer end of its own horizontally reciprocable piston rod 40. As shown in Fig. 6, each scoop holder bracket 39 is prevented from rotating relative to the rod 40 by means of a bolt 44a which passes through a notch in the rod and tightens a clamp 44, to which the bracket 39 is detachably secured on the rod. As shown in Fig. 4, each of the piston rods 40 extends entirely through its own fluid pressure cylinder 41, the several cylinders being secured by brackets 42 to the transversely extending supporting beam 37 of the frame 36. Each piston rod 40 is prevented from rotating by means of bolts 43 (Fig. 6A) which secures a crosshead 40a to the rod 40 and in sliding engagement with a guide surface 45a of a housing 45, one end of which forms one of the heads of each cylinder 41.

Referring now to one pair of scoops as an example of all, the scoops 13 and 14 are projected in a rectilinear path to a position which is directly beneath the orifice ring 1 with the outlets 2 and 3 (Fig. 1) in alignment with the scoops, by means of fluid pressure which is admitted to the cylinder 41 from a line 46 controlled by a timer (not shown). At the conclusion of a delivery operation and as soon as the pressure within the cylinder 41 has been relieved through line 46, the scoops 13 and 14 are withdrawn from operative position with respect to the feeder openings 2 and 3 and the deflectors 15 and 16 by the introduction of air pressure to the cylinder 41 through line 47 from the timer. The pressure introduced through line 47 retains the scoops 13 and 14 in their retracted positions with respect to the outlets of the feeder while the other scoops are successively brought into registry with the orifice outlets 2 and 3. It will be understood that during single gobbing operation pistons 41a position the single scoops successively in alignment with the single feeding orifice ring 1' and in timed relation with respect to the action of the feeding device.

The mounting arrangement for deflector 15 is illustrative of the pair of deflectors 15 and 16. As shown in Fig. 3, the upper end of the deflector 15 is detachably hooked onto a horizontally disposed spool 49, which is adjustably secured to a bracket member 51 carried by the upper horizontal frame member 37. The lower end of the deflector 15 is similarly hooked to a like spool member 53 detachably and adjustably carried by a bracket generally designated 55 which is secured to the housing of a delivery funnel operating mechanism generally designated 55'. The deflector 16 is similarly supported at its upper end on bracket member 52 (Fig. 1) and at its lower end is detachably hooked on spool 53 of the bracket 56 (Fig. 7) of the housing 55' (Fig. 3).

The delivery troughs 25, 26, 29 and 30, similarly are detachably hooked at their upper ends to spool members 49, all of which are adjustably mounted on the brackets 51 and 52.

More particularly, the spools 49 are carried by plates 49a which are provided with suitable bolt holes through which bolts 50a extend into tapped holes 51a in the bracket members 51 and 52. The plates 49a also are provided with pins 49b which cooperate with additional holes 51b in the brackets to properly position the spools. Two sets of tapped holes 51a and pin holes 51b are provided in the bracket 51 so that the delivery trough 25 may be selectively positioned for double gobbing (Fig. 1) and single gobbing (Fig. 2).

The lower ends of the troughs are supported for vertical adjustment by screws 57 to U-bracket elements 58 (Figs. 1 and 2) which are secured to the lower frame member 38 and prevent lateral shifting of the troughs. The U-bracket elements 58 are suitably supported for swivel and lateral adjustment in a horizontal plane as by bolts 59 extending through slots 60 in the brackets into the lower frame member 38. The U-brackets 58 also are provided with horizontal pins 61 to which the upper ends of the deflectors 21, 22, 31 and 32 are detachably hooked and the lower ends of the deflectors are detachably carried by the brackets 55 and 56, which are secured to the housing 55' of the funnel operating mechanism for each section. By suitably adjusting screws 62 and 63 (Figs. 3, 8 and 9) the brackets 55 and 56 and the lower end of the deflectors carried thereby may be shifted horizontally to properly align the lower end of the deflectors with the associated delivery funnels.

In changing from double to single gobbing operation, the troughs and deflectors to the inner molds 8, 10 and 12 are removed and the outer troughs and deflectors are realigned with the single molds 7', 9' and 11' (Fig. 2) which replace the double molds (Fig. 1) on the centers of the outer mold of each pair, and with the single orifice ring 1' and the single scoops 19' (Fig. 5) which replace the double scoops and the double orifice ring 1. In making the adjustment, the spool members 49 are moved to new positions on the bracket 51 as clearly appears from a comparison of their positions in Figs. 1 and 2. As there indicated, alternative tapped and aligning holes are provided with which to properly locate the spool members selectively in the positions shown.

The realignment of the troughs and deflectors is completed by adjustment of the bolt 59 and slot 60 fastening for the U-brackets 58 and the adjusting screws 62 and 63 which connect the brackets 55 to the housing 55'. The interchanging of the single and double delivery scoops on the scoop operating arms 40 is readily made by means of the slot and bolt connections 65 therebetween (Figs. 4 and 5).

*Funnel and operating mechanism*

The arrangement of the delivery funnels 17—18, 23—24, and 33—34 for guiding the charges into their respective blank molds is the same at each of the blank mold stations so that a description of the arrangement at one station will suffice for all. The arrangement includes novel operating and adjustment features in addition to novel means for adapting the delivery funnel mechanism for single and double gob operation selectively.

Referring more particularly to Figs. 3, 8, 9 and 11A, the funnels 17 are cylindrical members of circular cross-section which are mounted for movement between their vertically upright operative positions, at which they deliver charges from their associated deflectors to their associated blank molds, and their angularly inclined inoperative position shown in phantom in Fig. 3.

The pair of funnels 17—17 are mounted on an adjusting and operating mechanism, the details of which are illustrated in Figs. 7 to 11A. More particularly, the funnels 17 are provided with peripheral ribs 66 which are supported on the lower or yoke portions 67a and 68a of a pair of vertically depending supporting arms 67 and 68. The funnels are secured at their lower ends against lateral movement by a pair of pins 69, 70, which project upwardly from the ends of the yokes 67a, 68a and are located in suitable aligning passages in the ends of the rib 66, and at their upper ends by pins 71.

The funnels 17 are of somewhat less diameter than the internal diameter of the yokes 67a, 68a formed on the lower ends of the arms 67, 68 whereby the funnels are permitted a slight floating motion, the angular extent of this floating motion being limited however by the pins 69, 70 thus insuring the proper registration of the parts. The upper ends of the arms 67, 68 are adjustably secured to the lower end of a depending member 72, the upper end of which is mounted for pivotal movement by means of pins 73 journaled in bearing blocks 74 mounted on the frame 38.

In accordance with the invention, the mounting of the funnel supporting arms 67 and 68 on the depending pivotal member 72 provides means for individual lateral and limited pivotal adjustment between the arms and the member 72 so that the supported funnels 17 may be readily aligned with their blank molds. More particularly, the upper end of the funnel supporting yoke arm 67 is pinned to a shaft 73a which is rotatably journaled in bearing blocks 74a, 75 on the member 72. Pinned or otherwise secured to the end of shaft 73a is a crank arm 76 having an outer formed end which is located between flanges 77 of a spool or shipper 78 that is threaded on an eccentric 79 which is rotatably carried by a pin 80 fastened to the depending member 72. A handle portion 79a provides means for manually rotating the eccentric 79 on pin 80 and a wing nut 81 is provided for securing the eccentric in a desired position of adjustment.

Rotation of the spool or shipper 78 moves it longitudinally along the eccentric and shifts or ships the forked crank arm 76 together with the shaft 73a and the funnel supporting yoke arm 67 to a selected position of lateral adjustment for its funnel 17. Rotation of the eccentric 79 acts to oscillate the crank 76 and the shaft 73a together with the yoke arm 67. The wing nut may be tightened and the eccentric 79 secured when the funnel 17 has been laterally shifted and oscillated into alignment with its blank mold.

A similar adjustment mechanism in which corresponding components are identified by like reference numbers primed is provided for adjustably carrying the funnel supporting yoke arm 68.

Movement of the funnels 17 to their charge delivery positions is effected by means of the funnel operating mechanism 55' which includes a piston 82 which is reciprocally mounted in a cylinder 83 and which is connected by link 82a to depending member 72 that supports both funnels 17, 17. As shown in Figs. 8 and 10, the cylinder 83 is provided with a head 83a in which is located a novel arrangement of valves for assuring rapid operation of the piston 82. More particularly, the air or other fluid pressure medium for operating the piston 82 is supplied periodically by a line 84 through communicating passages 85, 86 and 87 in the head 83a into the cylinder 82 to overcome the force of tension springs 88 and move the piston outwardly thereby moving the funnels 17 to their charge-delivering positions. When the air is shut off in line 84 the one-way check valve 92, located in the passage 85, traps the air in the cylinder 83 to prevent the return of piston 82. The funnels 17 are moved to their inoperative positions by exhausting the air cylinders 83 by means of air supplied from the timer or other regulating source of supply through lines 89 to open normally spring-closed valves 90 to connect the passage 86 with exhaust vents 91.

As has been heretofore indicated with reference to the deflectors 15 and 16, the brackets 55 and 56 which carry the lower ends of the deflectors 15 and 16 are adjustably secured to the housing 55' of the funnel operating mechanism. Referring more particularly to Figs. 7–9, each bracket includes a plate 93 having slots 94 which permit limited adjustment of the bracket relative to the bolts 62, 63 with which it is secured to the housing. The spool 53 of each bracket which supports the lower end of one of the deflectors projects from a slide 96 which is secured for ready longitudinal adjustment on the side of the bracket plate 93.

As illustrated in Fig. 7, the slide 96 is spring pressed against the plate 93 by bolts 98 and spring 99, slotted openings 100 being provided in the slide 96 to permit the longitudinal adjustment of the slide relative to the bolts 98 and plate 93. Preferably the engaging surfaces of plate 93 and slide 96 are serrated, as at 97. The longitudinal adjustment of the slide 96 is manually effected by means of a spoke 101 which rotates an eccentric 102 and advances and retracts the slide 96 and its deflector supporting spool 53 to a desired position of adjustment relative to the upper end of its associated delivery funnel 17.

As shown in Fig. 8, the bracket plates 93 also include projecting lugs 103 which engage adjustment screws 103a adjustably secured in the pivotal member 72 and serve to stop the outward travel of the piston 82 at a preselected position corresponding to the charge-delivery positions for the funnels 17.

Having thus described a preferred embodiment of the invention, I claim:

1. In a glassware forming machine, a plurality of independent forming machine sections, a pair of glassware forming molds in each of said sections, means for operating the molds of each section simultaneously and for operating the molds of the several sections sequentially, glass charge feeding means including a plurality of outlets through which glass charges are periodically discharged, delivery means for periodically receiving groups of simultaneously discharged charges from a plurality of said outlets and delivering each successive group of charges to successive forming sections and for delivering the charges of each group simultaneously to the molds of a section, all of the molds being at the same elevation relative to the feeder outlets and wherein the molds of each pair of molds are equally spaced from opposite sides of a common vertical plane and said feeder outlets are equally spaced from opposite sides of the same common vertical plane.

2. Apparatus as recited in claim 1 and wherein said delivery means includes an individual charge guiding passageway to each of said molds from an associated feeder discharge outlet and wherein the passageway to all the molds of a section are identical in length, plan and profile.

3. Apparatus as described in claim 2 and wherein said delivery means includes means for sequentially locating the charge guiding passageways to the several sections in charge receiving relation to their feeder outlets and for locating a discharge portion of each passageway in charge delivering relation to its associated mold.

4. Apparatus as described in claim 2 and wherein each charge delivery passageway includes an operable charge receiving scoop portion and an operable delivery funnel portion connected by an intermediate stationary deflector portion, and means for moving the scoops and funnels of successive sections simultaneously into and simultaneously out of charges receiving and delivering relation.

5. Apparatus as recited in claim 2 and means for modifying and adjusting the passageways to one mold of each section to receive mold charges sequentially from a different feeder outlet.

6. In a glassware forming machine, a plurality of independent forming machine sections, a pair of spaced glassware forming molds in each section, each pair comprising an inner and an outer mold, and with the inner molds and the outer molds of the several sections respectively located along two parallel straight lines, means for simultaneously opening and closing the molds of each pair and for opening and closing the mold pairs of the several sections sequentially, glass charge feeding means having a pair of delivery outlets including an inner and outer outlet spaced a lesser distance apart than said spaced molds through which a pair of glass charges are periodically discharged, said outlets being disposed so that the distance from the inner outlet to each inner mold is identical to the distance to the corresponding outer mold from the outer outlet, and means for periodically receiving pairs of charges simultaneously discharged from said outlets and delivering each successive pair of charges to successive forming sections and for delivering the charges of each group simultaneously to the molds of a section, all of the molds being at the same elevation relative to the feeder outlets and wherein the molds of each pair of molds are equally spaced from opposite sides of a common vertical plane and said feeder outlets are equally spaced from opposite sides of the same common vertical plane.

7. Apparatus as recited in claim 6 and wherein said receiving and delivering means includes an individual charge directing passageway to each of said molds from an associated feeder discharge outlet and wherein the passageway to the molds of a section are identical in length, plan and profile.

8. Apparatus as described in claim 6 and wherein said receiving and delivering means includes means for sequentially locating the delivery passageways to the several sections in charge receiving relation to their feeder outlets and for locating a discharge portion of each passageway in charge delivering relation to its associated mold.

9. Apparatus as described in claim 6 and wherein each charge delivery passageway includes an operable charge receiving scoop portion and an operable delivery funnel portion connected by an intermediate stationary deflector portion, and means for moving the scoops and funnels of successive sections simultaneously into and simultaneously out of charge receiving and delivering relation.

10. Apparatus as recited in claim 6 and means for modifying and adjusting the passageways to one mold of each pair of molds to receive charges sequentially from a different feeder outlet.

11. In a glassware forming machine, a first and a second glassware forming mold, means for simultaneously opening and closing said molds, glass charge feeding means having a first and a second delivery outlet through which a pair of glass charges are periodically discharged, said outlets being disposed so that the distance from the first outlet to the first mold is identical to the distance to the second mold from the second outlet, and means including a pair of charge guiding passageways for periodically receiving pairs of charges simultaneously discharged from said outlet and delivering said charges to said molds and wherein each charge delivery passageway includes an operable charge receiving scoop portion and an operable delivery funnel portion connected by an intermediate stationary deflector portion, means for moving the scoops simultaneously into and simultaneously out of charge receiving relation, means for supporting and moving said funnels simultaneously into and simultaneously out of charge delivering position with respect to said molds, said supporting and moving means including a pivoted supporting member for said funnels, and an adjustable member supporting said stationary deflectors and limiting the movement of the funnel supporting member to funnel registering position with respect to the deflectors when the funnel supporting member is moved to the charge delivering position.

12. Apparatus as recited in claim 11 and including means for adjustably securing said funnels individually to said supporting member, the adjustable means including a threaded shipper member for laterally shipping each funnel and an eccentric for effecting adjusting movement of each funnel in all directions at right angles to the direction of said lateral movement.

GEORGE E. ROWE.

References Cited in the file of this patent

UNITED STATES PATENTS

| Number | Name | Date |
|---|---|---|
| 1,626,702 | Soubier | May 3, 1927 |
| 1,911,119 | Ingle | May 23, 1933 |
| 1,976,194 | Rowe | Oct. 9, 1934 |
| 2,081,859 | Peiler et al. | May 25, 1937 |
| 2,267,236 | Goodrich | Dec. 23, 1941 |
| 2,340,729 | Barker | Feb. 1, 1944 |